(12) United States Patent
Yang et al.

(10) Patent No.: US 11,932,350 B2
(45) Date of Patent: Mar. 19, 2024

(54) POWER ASSISTED ELECTRIC BICYCLE, TRANSMISSION DEVICE, AND OPERATION METHOD

(71) Applicant: Gogoro Inc., Hong Kong (CN)

(72) Inventors: Neng-Jie Yang, Taoyuan (TW);
Ying-Che Shih, Taoyuan (TW);
Sung-Ching Lin, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 589 days.

(21) Appl. No.: 17/078,669

(22) Filed: Oct. 23, 2020

(65) Prior Publication Data

US 2021/0122443 A1 Apr. 29, 2021

(30) Foreign Application Priority Data

Oct. 24, 2019 (TW) .................................. 108138466

(51) Int. Cl.
*B62M 6/50* (2010.01)
*B62J 45/20* (2020.01)
(Continued)

(52) U.S. Cl.
CPC ................ *B62M 6/50* (2013.01); *B62J 45/20* (2020.02); *B62J 45/41* (2020.02); *B62M 6/90* (2013.01); *B62M 25/08* (2013.01)

(58) Field of Classification Search
CPC .......... B62M 6/50; B62M 6/90; B62M 25/08; B62M 6/60; B62J 45/20; B62J 45/41; B62J 45/411
See application file for complete search history.

(56) References Cited

U.S. PATENT DOCUMENTS

| 5,505,277 A | 4/1996 | Suganuma et al. |
| 5,599,244 A * | 2/1997 | Ethington .............. B62M 9/123 |
| | | 474/81 |

(Continued)

FOREIGN PATENT DOCUMENTS

| CN | 1229750 A | 9/1999 |
| JP | 2005132275 A | 5/2005 |
| TW | I622524 B | 5/2018 |

OTHER PUBLICATIONS

European search report issued for copending EP Application No. EP20203651.3, Applicant: Gogoro Inc., dated Mar. 4, 2021, 4 pages.

(Continued)

*Primary Examiner* — Richard M Camby
(74) *Attorney, Agent, or Firm* — Perkins Cole LLP

(57) ABSTRACT

A power assisted electric bicycle includes a body, a motor, a torque sensor, and a controller. The motor is operated in an operating period. The torque sensor is configured to output a plurality of torque signals corresponding to a pedal force. The controller is coupled to the motor and the torque sensor. The controller is configured to: receive the torque signals from the torque sensor; determine a peak and a valley, which is adjacent to the peak, among the torque signals; compute and determine a pedaling period between the peak and the valley, which is adjacent to the peak, among the torque signals; and generate an error signal associated with the torque sensor if it is determined that the pedaling period and the operating period fail to meet a default ratio.

15 Claims, 4 Drawing Sheets

(51) Int. Cl.
*B62J 45/41* (2020.01)
*B62M 6/90* (2010.01)
*B62M 25/08* (2006.01)

(56) References Cited

U.S. PATENT DOCUMENTS

| | | | |
|---|---|---|---|
| 9,810,593 B2* | 11/2017 | Carrasco Vergara | B62M 3/00 |
| 10,562,401 B2* | 2/2020 | Hosaka | B60L 3/04 |
| 2014/0165744 A1* | 6/2014 | Lull | B62J 45/421 |
| | | | 73/862.338 |
| 2016/0202710 A1* | 7/2016 | Hosaka | G05D 17/02 |
| | | | 318/452 |
| 2017/0021896 A1* | 1/2017 | Tsuchizawa | B62M 6/45 |

OTHER PUBLICATIONS

Office Action issued for copending China Application No. CN201911017137.7, Applicant: Gogoro Inc., dated Nov. 17, 2021, 11 pages.

\* cited by examiner

POWER ASSISTED ELECTRIC BICYCLE, TRANSMISSION DEVICE, AND OPERATION METHOD

CROSS-REFERENCE TO RELATED APPLICATION(S)

This application claims priority to and the benefit of Taiwan Application Serial Number 108138466, filed on Oct. 24, 2019, the entire content of which is incorporated herein by reference as if fully set forth below in its entirety and for all applicable purposes.

TECHNICAL FIELD

The disclosure generally relates to bicycles and methods thereof, and more particularly, to power assisted electric bicycles and operation methods.

BACKGROUND

Bicycles are the most convenient transportation. Recently, bicycles are developed to have auxiliary power to provide easier riding experience for users. Such bicycles are, for example, power assisted electric bicycles, which allows user to save physical strength because of the auxiliary power. As such, users are more inclined to choose bicycles with auxiliary power.

Although the auxiliary power may reduce the consumption of physical strength while riding, if the element providing power is broken or the power is provided inappropriately, the safety of the bicycle becomes questionable. Accordingly, how to ensure safety for auxiliary power for such bicycles is an important problem to be solved.

SUMMARY

The disclosure can be more fully understood by reading the following detailed description of the embodiments, with reference made to the accompanying drawings as described below. It should be noted that the features in the drawings are not necessarily to scale. The dimensions of the features may be arbitrarily increased or decreased for clarity of discussion.

The present disclosure of an embodiment provides a power assisted electric bicycle including a body, a motor, a torque sensor, and a controller. The motor is operated in an operating period. The torque sensor is configured to output a plurality of torque signals corresponding to a pedal force. The controller is coupled to the motor and the torque sensor. The controller is configured to: receive the torque signals from the torque sensor; determine a peak and a valley, which is adjacent to the peak, among the torque signals; compute and determine a pedaling period between the peak and the valley, which is adjacent to the peak, among the torque signals; and generate an error signal associated with the torque sensor if it is determined that the pedaling period and the operating period fail to meet a default ratio.

One aspect of the present disclosure is to provide an operation method configured for a power assisted electric bicycle. The power assisted electric bicycle includes a motor, a torque sensor, and a controller. The motor is operated in an operating period and the torque sensor is configured to output a plurality of torque signals corresponding to a pedal force. The operation method includes steps of: receiving the torque signals from the torque sensor; determining a peak and a valley, which is adjacent to the peak, among the torque signals; computing and determining a pedaling period between the peak and the valley, which is adjacent to the peak, among the torque signals; and generating an error signal associated with the torque sensor if it is determined that the pedaling period and the operating period fail to meet a default ratio.

One aspect of the present disclosure is to provide a transmission device including a motor, a torque sensor, and a controller. The motor is operated in an operating period. The torque sensor is configured to output a plurality of torque signals corresponding to a pedal force. The controller is coupled to the motor and the torque sensor. The controller is configured to: receive the torque signals from the torque sensor; determine a peak and a valley, which is adjacent to the peak, among the torque signals; compute and determine a pedaling period between the peak and the valley, which is adjacent to the peak, among the torque signals; and generate an error signal associated with the torque sensor if it is determined that the pedaling period and the operating period fail to meet a default ratio.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as described below. It should be noted that the features in the drawings are not necessarily to scale. The dimensions of the features may be arbitrarily increased or decreased for clarity of discussion.

DETAILED DESCRIPTION

Figure 1:
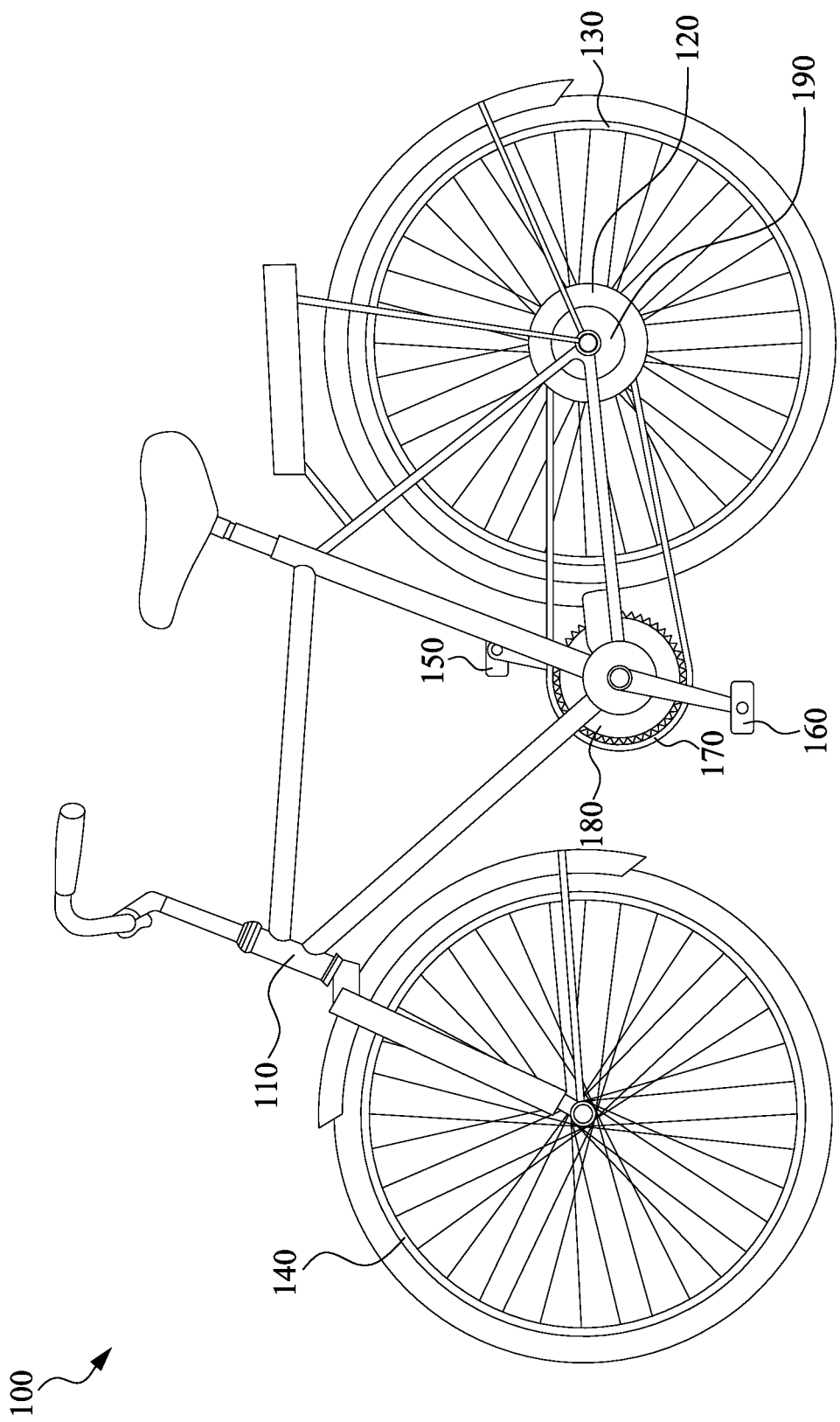
FIG. 1 depicts the appearance of a power assisted electric bicycle according to some embodiments of the present disclosure.

The technical terms "first", "second" and similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 depicts the appearance of a power assisted electric bicycle 100 according to some embodiments of the present disclosure. As shown in FIG. 1, the power assisted electric bicycle 100 includes a body 110 and a transmission device 120. The transmission device 120 is disposed on the body 110. The body 110 can be, but is not limited to, a bicycle having a single wheel or multiple wheels, a power assisted electric bicycle, or any other traffic vehicles that generate driving force with torque. For the sake of simplicity, two-wheeled bicycles are taken as example in the disclosure, but the body 110 of the disclosure is not limited thereto.

In some embodiments, the transmission device 120 is disposed on the body 110 and connected to a rear wheel 130. For example, the transmission device 120 may be connected to the rear wheel 130 via a variable speed gear set or other transmission elements; alternatively, the transmission device 120 may also be directly disposed on the rear wheel 130, as shown in FIG. 1. When a user rides the power assisted electric bicycle 100 by pedaling a right pedal 150 and a left pedal 160, the chain 170 is driven by the rotation of the right pedal 150 and the left pedal 160 such that it further drives the transmission device 120 and the rear wheel 130 to rotate. In this way, the pedal force exerted by the user may be received by the transmission device 120. In some other embodiments, the transmission device 120 may also be connected to a front-wheel 140 of the body 110 or is disposed on the front-wheel 140. When the user rides the power assisted electric bicycle 100 by pedaling the right pedal 150 and the left pedal 160, the transmission device 120 receives the pedal force exerted by the user and then output power to assist the user in riding. In some embodiments, the chain 170 can be, but is not limited to, a belt or any other elements that can transmit power.

Figure 2:
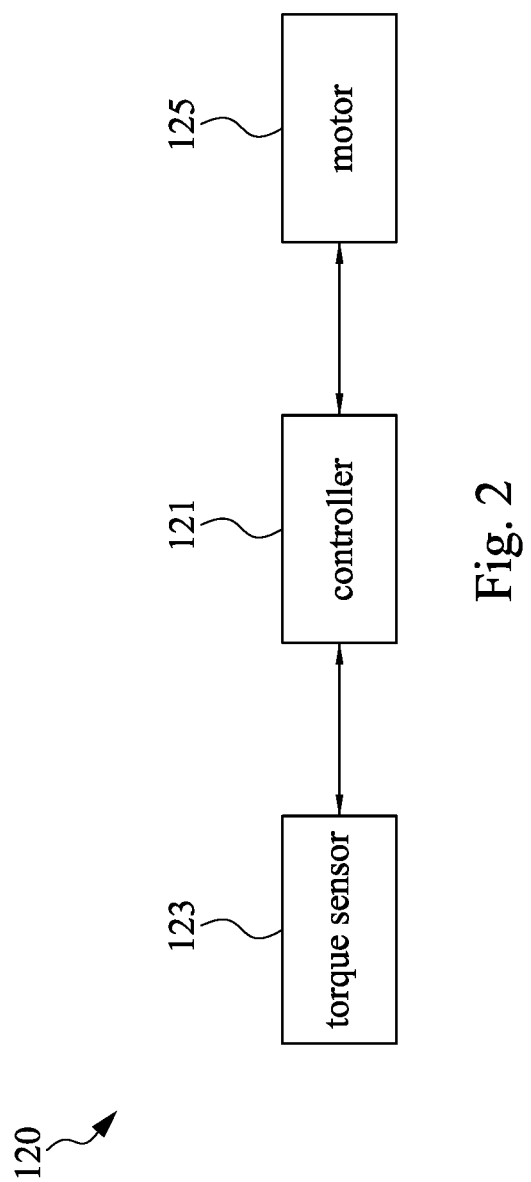
FIG. 2 depicts a block diagram of a transmission device according to some embodiments of the present disclosure.

Reference is made to FIG. 2. FIG. 2 depicts a block diagram of the transmission device 120 according to some embodiments of the present disclosure. In the embodiments of FIG. 2, a torque sensor 123 is disposed near the right pedal 150 and the left pedal 160 of the power assisted electric bicycle 100 in FIG. 1. For example, the torque sensor 123 is disposed adjacent to a shaft, which rotates simultaneously with the right pedal 150 and the left pedal 160, so as to detect the pedal force exerted by the user. In some embodiments, the torque sensor 123 can also be disposed near any place of the transmission system (i.e., the right pedal 150 and the left pedal 160, a sprocket 180, the chain 170, the transmission device 120 or the rear wheel 130) which is easy to dispose on.

As shown in FIG. 2, the transmission device 120 includes a controller 121, the torque sensor 123 and a motor 125. The controller 121 is coupled to the torque sensor 123 and the motor 125. The controller 121 is configured to receive a plurality of torque signals, which are generated by the torque sensor 123, corresponding to continuous time points. The controller 121 is further configured to set/control the torque output of the motor 125 based on the value and the pattern (for example, pedaling frequency/period of the user) of the torque signals. The controller 121 can be a motor control unit (MCU), an electric control unit (ECU), other elements having computation ability or the combinations of any of the above elements.

In some embodiments, the motor 125 is coupled to the rear wheel 130 of the body 110 in FIG. 1. The motor 125 is configured to transform electric power into torque according to the data or commands transmitted by the controller 121. As such, in addition to the pedal force exerted by the user, the motor 125 can further assist the movement of the body 110.

The torque sensor 123 is coupled to the controller 121. The torque sensor 123 is configured to detect the pedal force exerted by the user's feet and compute the torque signal corresponding to the pedal force. The torque sensor 123 can be, but is not limited to, a non-contact type torque sensor (e.g., an inductive torque sensor), a contact type torque sensor (e.g., a potentiometer torque sensor), an optical torque sensor, and so on.

When the user rides the power assisted electric bicycle 100, the motor 125 can adjust the outputted power according to the riding status of the user. When the user is pedaling, if the torque signal provided by the torque sensor cannot faithfully reflect the power outputted by the motor 125 due to malfunction or any other factors, the user may lose balance.

Figure 3:
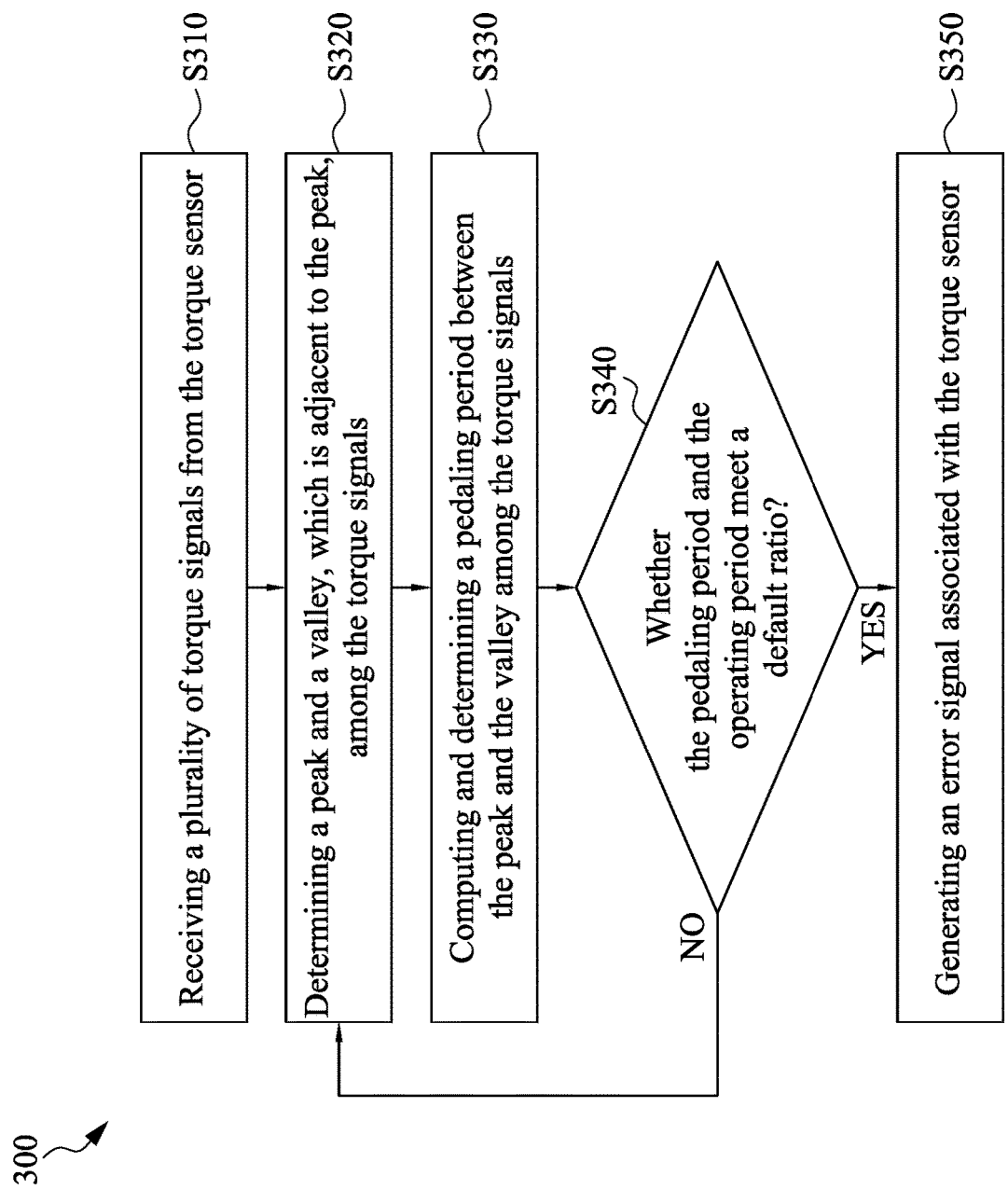
FIG. 3 depicts a flow chart of an operation method according to some embodiments of the present disclosure.

Reference is made to FIG. 3. FIG. 3 depicts a flow chart of an operation method 300 according to some embodiments of the present disclosure. The operation method 300 of the present disclosure is configured for the power assisted electric bicycle 100 in FIG. 1. For the sake of conciseness for each step of the operation method 300, the following description is provided incorporated with FIG. 2 and FIG. 3.

In step S310, a plurality of torque signals is received from the torque sensor 123. The plurality of torque signals correspond to the sampling data of the user's pedal force at continuous time points. For example, when the user rides the power assisted electric bicycle 100, the torque sensor 123 detects the pedal force in each sampling period, then, the torque sensor 123 computes and generates a plurality of torque signals by continuously sampling. The controller 121 receives the plurality of torque signals from the torque sensor 123 and analyzes the torque signals to provide data for determining whether any abnormal situations had happened during the riding of the power assisted electric bicycle 100.

In step S320, a peak and a valley, which is adjacent to the peak, among the torque signals are determined by the controller 121. In some embodiments, the torque signals are time-continuous sampling data, and each peak and a valley adjacent to the peak defines a time period. Therefore, in each time period, the peak is the maximal value among the torque signals, and the valley is the minimal value among the torque signals.

For example, the torque sensor 123 detects the torque signals of the right pedal 150 and the left pedal 160 continuously. When the right pedal 150 and the left pedal 160 are at the same height, which is at a mid-horizontal height position (e.g., the right pedal 150 is in the front and the left pedal 160 is in the back), the force exerted by the user's feet is approximately vertical to cranks (not shown in figures), which are connected to the right pedal 150 and the sprocket 180. Therefore, the torque sensor 123 can detect the maximum torque signal. Herein, the maximum torque signal is the peak. On the other hand, when the right pedal 150 rotates to the lowest position (the left pedal 160 is at the highest position at this time), the torque generated by the pedal force being exerted to the cranks (not shown) is very small due to similar reasons described above, and the torque is the minimal torque signal during the pedaling process of the user. The minimal torque signal is the valley. As described above, each peak and a valley adjacent to the peak defines a time period. That is, a time period is the time length required for the user to pedal one foot from the horizontal position to the vertical position (e.g., the right foot pedals the right pedal 150 from the front to the bottom). If one pedaling cycle of the right foot is regarded as a complete pedaling period, a time period is a quarter of a complete pedaling period.

After the peak and the valley are confirmed, the pedaling frequency/period and a pattern of the user can be obtained accordingly. In the following paragraphs, how the peak and the valley are found among the torque signals and how the time period is found between the peak and the valley (i.e., the pedaling period) are further described in details.

Figure 4:
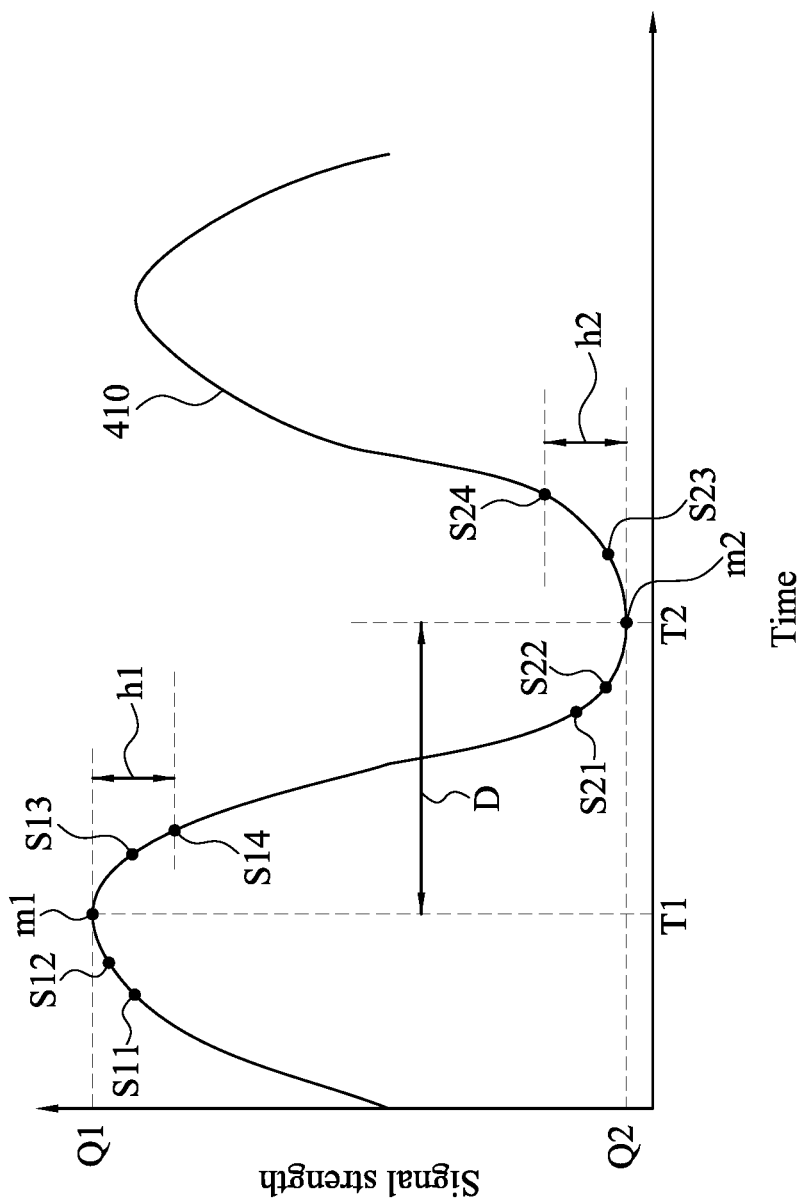
FIG. 4 is a schematic diagram illustrating a waveform of a torque signal generated by the power assisted electric bicycle illustrated in FIG. 1 when it is being pedaled according to some embodiments of the present disclosure.

For the sake of ease for describing step S320, reference is made to FIG. 4. FIG. 4 is a schematic diagram illustrating a waveform of a torque signal 410 generated by the power assisted electric bicycle 100 illustrated in FIG. 1 when it is being pedaled according to some embodiments of the present disclosure. As shown in FIG. 4, the horizontal axis represents time and the vertical axis represents signal strength.

In some embodiments, the controller 121 is configured to detect the signal strength of the torque signal 410 based on time sequence, so as to determine the time point at which the peak or the valley appears. For example, the controller 121 may compare a signal strength value of the torque signals at a first time (e.g., the $N^{th}$ time point) with a signal strength value of the torque signals at a second time (e.g., the $(N+1)^{th}$ time point). Herein, the second time is after the first time. For example, the torque signal at the second time is the torque signal sampled at a next time point after the first time. If the signal strength value of the torque signal at the second time is larger than the signal strength value of the torque signal at the first time, the signal strength value of the torque signal at the second time is set as a temporary maximal value, and the event in which the temporary maximal value occurs at the second time is recorded. On the other hand, if the signal strength value of the torque signal at the second time is smaller than the signal strength value of the torque signal at the first time, the currently obtained temporary maximal value and its time point are kept and are compared with the torque signal sampled at the next time point. For example, the current temporary maximal value (e.g., the signal strength value of the torque signal at the first time) is compared with the signal strength value of the torque signal at a third time, and the third time is after the second time. The third time point may be immediately after the second time or may be several time points after the second time, and all the signal strength values corresponding to these time points are not larger than the current temporary maximal value of the torque signals (e.g., the third time point is the fifth time point after the second time, and the torque signals at the first to the fourth time points after the second time do not have a signal strength value larger than the current temporary maximal value). If the signal strength value of the torque signal at the third time is larger than the signal strength value of the torque signal at the first time, the signal strength value of the third time is set as the temporary maximal value, and the event in which the temporary maximal value occurs at the third time is recorded. In other words, the controller 121 is configured to find the maximum signal strength value among the sampled torque signals, record the maximal signal strength value as the temporary maximal value and record the corresponding time point.

For example, as shown in FIG. 4, the controller 121 is configured to compare the signal strength value S11 with the signal strength value S12 of the torque signals 410. Because the signal strength value S12 is larger than the signal strength value S11, the controller 121 sets the signal strength value S12 as the temporary maximal value of the torque signal 410 and records the time point corresponding to the signal strength value S12. Similarly, the controller 121 is configured to continuously determine whether the next detected torque signal has a larger signal strength value. If a larger signal strength value is found, the larger signal strength value is set as the temporary maximal value, and the current temporary maximal value and the corresponding time point are updated. As shown in FIG. 4, according to the determination process described above, the controller 121 sets the signal strength value Q1 of the torque signal at the time T1 as the temporary maximal value.

After determining each torque signal and recording the temporary maximal value and the corresponding time point of the torque signals, the controller 121 is further configured to determine whether the temporary maximal value is the peak. In some embodiments, the controller 121 is configured to compute a difference value which is acquired by subtracting a default value from the temporary maximal value and determine whether the difference value is larger than the signal strength value at the current time point. If the difference value is larger than the signal strength value at the current time point, the temporary maximal value is determined as the peak. If the difference value is smaller than the signal strength value at the current time point, the controller 121 is configured to return to the previous step to compare the signal strength value of the next time point with the temporary maximal value.

For example, as shown in FIG. 4, the temporary maximal value is the signal strength value Q1 at the time point of the signal strength value S13. In some embodiments, when the controller 121 computes the difference value, which is acquired by subtracting the default value h1 from the temporary maximal value, and determines that the difference value is smaller than the signal strength value S13, the controller 121 continues to detect the signal strength value at the next time point (e.g., the signal strength value S14). Because the difference value, which is acquired by subtracting the default value h1 from the temporary maximal value and computed by the controller 121, is larger than the signal strength value S14, the controller 121 determines that the temporary maximal value (i.e., the signal strength value Q1 at the time T1 which corresponds to the peak m1) is the peak of the torque signal 410 in an operating period. The operating period is described below.

The default value h1 is applied to confirm whether the current temporary maximal value is the peak because the torque signals are continuous-time sampling signals of the user's pedal force, and the signal values are not necessarily a continuously increasing curve shown in FIG. 4. There may be noise signals or surge signals in the torque signals, and these noise or surge signals will cause the problem in which the peak is incorrectly determined. As such, via the buffer time of the default value h1, it is ensured that the current value found by the controller 121 is the maximal value, so as to avoid incorrectly determining the position of the peak. Furthermore, the default value h1 is applied as a threshold for determining the peak. For example, if the signal strengths of the following signal values are in a decreasing trend, it will not be beneficial to compare the current signal value with the temporary maximal value. Accordingly, the threshold is designed for avoiding unnecessary computations.

In some embodiments, after the controller 121 determines the peak of the torque signal 410, the controller 121 is configured to determine the signal strength of the torque signal 410 based on time sequence. For example, the step of detecting the valley is performed when the signal strength value is smaller than a middle value (such as the historical average signal strength of the torque signals) to determine which signal strength is the valley. Alternatively, in some embodiments, after obtaining the peak and the corresponding time point, the controller 121 then performs the determination of the valley, vice versa. For example, the controller 121 is configured to compare the signal strength value of the torque signal sampled at the first time (e.g., the $M^{th}$ time point) with the signal strength value of the torque signal sampled at the second time (e.g., the $(M+1)^{th}$ time point). Herein, the second time is after the first time. If the signal strength value of the torque signal at the second time is smaller than the signal strength value of the torque signal at the first time, the signal strength value of the torque signal at the second time is set as the temporary minimal value, and the event in which the temporary minimal value occurs at the first time is recorded. On the other hand, if the signal strength value of the torque signal at the second time is larger than the signal strength value of the torque signal at the first time, the current temporary minimal value and the corresponding time point are kept and are compared with the torque signal sampled at the next time point. For example, the current temporary minimal value (e.g., the signal strength value of the torque signal at the first time) is compared with the signal strength value of the torque signal at the third time, herein, the third time is a time point after the second time. If the signal strength value at the third time is smaller than the signal strength value at the first time, the signal strength value of the torque signal at the third time is set as the temporary minimal value, and so on. Accordingly, the controller 121 is configured to find the smallest value among the signal strength values and records the smallest value as the temporary minimal value along with the corresponding time point.

For example, the controller 121 is configured to compare the signal strength value S21 of the torque signal 410 with the signal strength value S22 of the torque signal 410, as shown in FIG. 4. Because the signal strength value S22 is smaller than the signal strength value S21, the controller 121 sets the signal strength value S22 as the temporary minimal value of the torque signal 410 and records the time corresponding to the signal strength value S22. Similarly, the controller 121 is configured to continuously determine whether a smaller signal strength value can be found. If there is any next torque signal having a smaller signal strength value, the smaller signal strength value is set as the temporary minimal value, and the current minimal value is updated. As shown in FIG. 4, according to the determination process described above, the controller 121 sets the signal strength value Q2 of the torque signal at the time T2 as the temporary minimal value.

After determining each torque signal and recording the temporary minimal value of the torque signal and the corresponding time point, the controller 121 is further configured to determine whether the temporary minimal value is the valley. In some embodiments, the controller 121 is configured to compute a sum value of the temporary minimal value and a default value and determine whether the sum value is smaller than the signal strength value at the current time point. If the sum value is smaller than the signal strength value at the current time point, the temporary minimal value is determined as the valley. If the sum value is larger than the signal strength value at the current time point, the controller 121 will return to the previous step to compare the signal strength value of the next time point with the temporary minimal value.

For example, as shown in FIG. 4, the temporary minimal value is the signal strength value Q2 at the time point of the signal strength value S23. In some embodiments, when the controller 121 computes the sum value of the temporary minimal value and the default value h2 and determines that the sum value is larger than the signal strength value S23, the controller 121 continues to detect the signal strength value at the next time point (e.g., the signal strength value S24). Because the sum value of the temporary minimal value and the default value h2 computed by the controller 121 is smaller than the signal strength value S24, the controller 121 determines that the temporary minimal value (i.e., the signal strength value Q2 at the time T2 which corresponds to the valley m2) is the valley of the torque signal 410 in one operating period.

The default value h2 is applied to confirm whether the current temporary minimal value is the valley because the torque signals are time-continuous sampling signals of the user's pedal force and the signal values do not necessarily represent a continuously increasing curve as shown in FIG. 4. There may be noise signals or surge signals in the torque signals, and the noise or surge signals will cause the problem in which the valley is incorrectly determined. As such, via the buffer time provided by the default value h2, it is ensured that the current value found is the minimal value so as to avoid incorrectly determining the position of the valley. Furthermore, the default value h2 is applied as a threshold for determining the valley. For example, if the signal strengths of the following signal values are in an increasing trend, it will not be beneficial to compare the current signal value with the temporary minimal value. Accordingly, the threshold is designed for avoiding unnecessary computations.

It should be noted that there is no other peak or valley between the peak m1 and the valley m2 in FIG. 4. In other words, the peak and valley obtained in step S320 are adjacent to each other.

Next, after the controller 121 determines the peak Q1 and the valley Q2, which is adjacent to the peak Q1, of the torque signals, the controller 121 is configured to compute and determine a pedaling period between the peak and the valley among the torque signals in step S330. In some embodiments, the controller 121 computes the pedaling period D (e.g., D=T1−T2) according to the time difference between the time T1 of the peak Q1 and the time T2 of the valley Q2.

Reference is made to FIG. 2 and FIG. 3 again, in step S340, the controller 121 is configured to determine whether the pedaling period D and the operating period of the motor 125 meet a default ratio.

In some embodiments, the controller 121 is configured to compute and determine the operating period according to the equation (1):

$$P=0.5*GR/S \qquad \text{equation (1)}$$

In equation (1), P is the operating period, GR is the gear ratio which is the ratio of the number of teeth of the sprocket 180 to the number of teeth of a wheel gear 190, and S is the rotation speed of the motor 125. For example, if the number of teeth of the sprocket 180 is seventy-two and the teeth of the wheel gear 190 is twenty-four, the gear ratio will be three. That is, when the user rotates the pedals for one cycle, the rear wheel 130 (and the motor 125 which is associated with the rear wheel 130) will rotate three cycles. Therefore, by equation (1), the gear ratio can be used to figure out the relationship between the current vehicle speed and the pedaling of the user, so that the operating period can be calculated.

It should be noted that because both the right pedal 150 and the left pedal 160 can be pedaled to generate the pedal force, the operating period P herein is not an entire pedaling cycle of the right pedal 150 (or the left pedal 160). Instead, the operating period corresponds to the time of the right pedal 150 or the left pedal 160 being pedaled once. That is, the operating period P corresponds to half of the entire pedaling cycle. On the other hand, the pedaling period D, which is the period from the peak to the valley adjacent to the peak, corresponds to a quarter of the entire cycle. Therefore, in the condition that the gear ratio GR is not taken into consideration, the operating period P is twice the pedaling period D.

In some embodiments, because the motor 125 and the torque sensor 123 of the transmission device 120 as shown in FIG. 1 are disposed on the rear wheel 130, the vehicle speed is the same as the rotation speed of the motor 125. In some other embodiments, the motor 125 of the transmission device 120 is not disposed on the rear wheel 130 as shown in FIG. 1. Instead, there may be other transmission elements (e.g., the gear module/the derailleur or the like) to connect the motor 125 and the rear wheel 130. As such, if the rotation speed of the motor 125 is applied for computing the current vehicle speed, not only the gear ratio but also the proportional relationship (e.g., the ratio of the gear module, the level of the derailleur, and the like) between the rotation speed of the motor 125 and the vehicle speed should be considered in addition to equation (1).

In some embodiments, the default ratio may be twice (i.e., the original ratio relation between the operating period P and the pedaling period D) the gear ratio of the power assisted electric bicycle 100 (i.e., the ratio of the number of teeth of the sprocket 180 to the number of the teeth of the wheel gear 190), or the default ratio may be the other value proportional to the gear ratio. In some embodiments, the torque sensor 123 is not disposed on the rear wheel, and the torque sensor 123 is disposed between the right pedal 150 and the left pedal 160 instead. Accordingly, the pedaling of the user is proportional to the vehicle speed, and the default ratio of the pedaling period D to the operating period P is not related to the gear ratio.

In one embodiment, the value of the pedaling period D which is computed in step S330 is 0.5, and the ratio of the pedaling period D to the operating period P is computed to be 1. When the value of the operating period, which is computed according to equation (1), is 3, in step S340, if the default ratio is 1 to 3, the controller 121 determines that the ratio of the pedaling period to the operating period meet the default ratio. That is, the power assisted electric bicycle 100 is functioning as expected. In another embodiment, the value of the pedaling period D, which is computed in step S330, is 0.75, and the value of the operating period, which is computed according to equation (1), is 3. If the default ratio is 1 to 3, the controller 121 determines that the ratio between the pedaling period and the operating period fails to meet the default ratio. That is, the rotation speed of the motor 125 is too fast and it is possible for the power assisted electric bicycle 100 to lose control. Alternatively, from the computation in step S330, the value of the pedaling period D is 1.25 and the value of the operating period is 3. The numbers represent that the rotation speed of the motor 125 is too slow and the motor 125 may have lost its power supply function. Under these situations, step S340 is performed. It should be noted that the disclosure utilizes the ratio of the pedaling period D to the operating period as the main factor of the determination process. In another embodiment, the disclosure also computes the ratio of the pedaling period D to the operating period to determine whether the ratio meets (e.g., equal to) a default ratio.

In step S340, if the ratio of the pedaling period D to the operating period meets the default ratio, the process returns to step S320. When the controller 121 detects the operations of the power assisted electric bicycle 100 (e.g., detects the pedaling of the user), the peak and the valley of the torque signals are detected continuously to keep tracking the operations of the power assisted electric bicycle 100.

If the determination is made that the ratio of the pedaling period D to the operating period fails to meet the default ratio, the process returns to step S350. In step S350, an error signal is generated by the controller 121 associated with the torque sensor 123.

In some embodiments, when the ratio of the pedaling period D to the operating period fails to meet, is larger or smaller than the default ratio, it represents that the power assisted electric bicycle 100 malfunctions. The malfunction herein means that, for example, the controller 121 detects abnormality when the user pedals the pedals. For example, the torque sensor 123 does not receive the torque of the pedals or the detected value of the torque is not within the normal range, or there is some disturbance of detecting or transmitting the torque signal, and so on. Accordingly, the controller 121 generates the error signal associated with malfunctions of the power assisted electric bicycle 100.

In some embodiments, the controller 121 is further configured to adjust the power provided to the motor 125 according to the error signal. For example, since it has been detected that the power assisted electric bicycle 100 may be abnormal, it is dangerous if the user still rides the bicycle. Therefore, the power provided to the motor 125 should be adjusted. For example, the power may be slowly reduced to decrease the vehicle speed of the power assisted electric bicycle, or power may be stopped and the pedaling force of the user may be simply used as the only power source of the power assisted electric bicycle, so as to prevent the user from getting hurt. In some embodiments, when the error signal occurs, the controller 121 is further configured to lock the motor 125 such that the power assisted electric bicycle 100 cannot move.

In some embodiments, the power assisted electric bicycle 100 may include a communication module (not shown). After the controller 121 generates the error signal, the controller 121 is configured to transmit the error signal to a user interface of the power assisted electric bicycle 100 (e.g., a monitor) through the communication module or to an electric device of the user (not shown). In some embodiments, the user's electric device is configured to execute a software program (not shown) to receive and recognize the error signal. After the user interface of the power assisted electric bicycle 100 or the electric device receives the error signal, the related warning information will be displayed on the user interface (e.g., text information or graphical information the part of the power assisted electric bicycle that malfunctions). The text information reminds the user about the abnormal status of the power assisted electric bicycle 100. In addition, the user can find out the part of the power assisted electric bicycle that malfunctions according to the graphical information, and the text information can assist the user in the troubleshooting process and/or by providing repair assistance information.

Accordingly, the power assisted electric bicycle, the operation method, and the transmission device are provided in the disclosure to detect the torque exerted by the pedal when the user rides the power assisted electric bicycle. The time length in which the pedal is pedaled for half cycle is computed and determined with the torque signal. The working period of the motor is also computed and determined. Accordingly, whether the ratio of the time length of the half cycle of the pedal to the period of the motor working half-cycle exceeds the safe range can be determined. As such, whether the torque sensor, the motor, or the related electric elements malfunction can be determined. Accordingly, the user can accurately monitor the functional status of the power assisted electric bicycle, and the safety of riding the power assisted electric bicycle can be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

We claim:

1. A power assisted electric bicycle, comprising:
   a body;
   a motor operated in an operating period;
   a torque sensor configured to output a plurality of torque signals corresponding to a pedal force; and
   a controller coupled to the motor and the torque sensor, wherein the controller is configured to:
   receive the torque signals from the torque sensor;
   determine a peak and a valley, which is adjacent to the peak, among the torque signals;
   compute and determine a pedaling period between the peak and the valley, which is adjacent to the peak, among the torque signals; and
   generate an error signal associated with the torque sensor if it is determined that the pedaling period and the operating period fail to meet a default ratio,
   wherein the controller is further configured to:
   compute and determine the operating period according to a vehicle speed of the power assisted electric bicycle at a time point; and
   wherein the vehicle speed of the power assisted electric bicycle at the time point is computed based on a rotation speed of the motor at the time point.

2. The power assisted electric bicycle of claim 1, wherein the torque signals comprise a first signal at a $N^{th}$ time point and a second signal at a $(N+1)^{th}$ time point, when a signal strength value of the second signal is larger than a signal strength value of the first signal, the signal strength value of the second signal is set as a temporary maximal value of the torque signals.

3. The power assisted electric bicycle of claim 2, wherein the torque signals further comprise a third signal at a time after the $(N+1)^{th}$ time point, when a signal strength value of the third signal is smaller than the temporary maximal value and when a difference value, which is acquired by subtracting a first default value from the temporary maximal value, is larger than the signal strength value of the third signal, the temporary maximal value is determined to be the peak of the torque signals.

4. The power assisted electric bicycle of claim 1, wherein the torque signals comprise a first signal at a $M^{th}$ time point and a second signal at a $(M+1)^{th}$ time point, when a signal strength value of the second signal is smaller than a signal strength value of the first signal, the signal strength value of the second signal is set as a temporary minimal value of the torque signals.

5. The power assisted electric bicycle of claim 4, wherein the torque signals further comprise a third signal at a time after the $(M+1)^{th}$ time point, when a signal strength value of the third signal is larger than the temporary minimal value and when a sum value of the temporary minimal value and a second default value is smaller than the signal strength value of the third signal, the temporary minimal value is determined to be the valley of the torque signals.

6. The power assisted electric bicycle of claim 1, wherein the default ratio is equal or proportional to a gear ratio, and the gear ratio is a ratio of a number of teeth of a sprocket to a number of teeth of a wheel gear.

7. The power assisted electric bicycle of claim 1, wherein the controller is configured to adjust power inputted to the motor according to the error signal, and/or an electric device is configured to generate a warning information according to the error signal.

8. An operation method configured for a power assisted electric bicycle, wherein the power assisted electric bicycle comprises a motor, a torque sensor and a controller, the motor is operated in an operating period and the torque sensor is configured to output a plurality of torque signals corresponding to a pedal force, wherein the operation method comprises:
   receiving the torque signals from the torque sensor;
   determining a peak and a valley, which is adjacent to the peak, among the torque signals;
   computing and determining a pedaling period between the peak and the valley, which is adjacent to the peak, among the torque signals; and
   generating an error signal associated with the torque sensor if it is determined that the pedaling period and the operating period fail to meet a default ratio,
   wherein the method further comprises:
   computing and determining the operating period according to a vehicle speed of the power assisted electric bicycle at a time point; and
   wherein the vehicle speed of the power assisted electric bicycle at the time point is computed based on a rotation speed of the motor at the time point.

9. The operation method of claim 8, wherein the torque signals comprise a first signal at a $N^{th}$ time point and a second signal at a $(N+1)^{th}$ time point, and the operation method further comprises:
   setting a signal strength value of the second signal as a temporary maximal value of the torque signals when the signal strength value of the second signal is larger than a signal strength value of the first signal.

10. The operation method of claim 9, wherein the torque signals further comprise a third signal at a time after the $(N+1)^{th}$ time point, and the operation method further comprises:
    determining the temporary maximal value to be the peak of the torque signals when a signal strength value of the third signal is smaller than the temporary maximal value and when a difference value, which is acquired by subtracting a first default value from the temporary maximal value, is larger than the signal strength value of the third signal.

11. The operation method of claim 8, wherein the torque signals comprise a first signal at a $M^{th}$ time point and a second signal at a $(M+1)^{th}$ time point, and the operation method further comprises:
    setting a signal strength value of the second signal as a temporary minimal value of the torque signals when the signal strength value of the second signal is smaller than a signal strength value of the first signal.

12. The operation method of claim 11, wherein the torque signals further comprise a third signal at a time after the $(M+1)^{th}$ time point, and the operation method further comprises:

determining the temporary minimal value to be the valley of the torque signals when a signal strength value of the third signal is larger than the temporary minimal value and when a sum value of the temporary minimal value and a second default value is smaller than the signal strength value of the third signal.

13. The operation method of claim 8, wherein the default ratio is equal or proportional to a gear ratio, and the gear ratio is a ratio of a number of teeth of a sprocket to a number of teeth of a wheel gear.

14. The operation method of claim 8, further comprising adjusting power inputted to the motor by the controller according to the error signal and/or generating a warning information by an electric device according to the error signal.

15. A transmission device, comprising:
a motor operated in an operating period;
a torque sensor configured to output a plurality of torque signals corresponding to a pedal force; and
a controller coupled to the motor and the torque sensor, wherein the controller is configured to:
  receive the torque signals from the torque sensor;
  determine a peak and a valley, which is adjacent to the peak, among the torque signals;
  compute and determine a pedaling period between the peak and the valley, which is adjacent to the peak, among the torque signals; and
  generate an error signal associated with the torque sensor if it is determined that the pedaling period and the operating period fail to meet a default ratio,
wherein the controller is further configured to:
  compute and determine the operating period according to a vehicle speed of the power assisted electric bicycle at a time point; and
  wherein the vehicle speed of the power assisted electric bicycle at the time point is computed based on a rotation speed of the motor at the time point.

* * * * *